F. SIEBER.
INSULATOR.
APPLICATION FILED JULY 15, 1914.
1,253,736.
Patented Jan. 15, 1918.
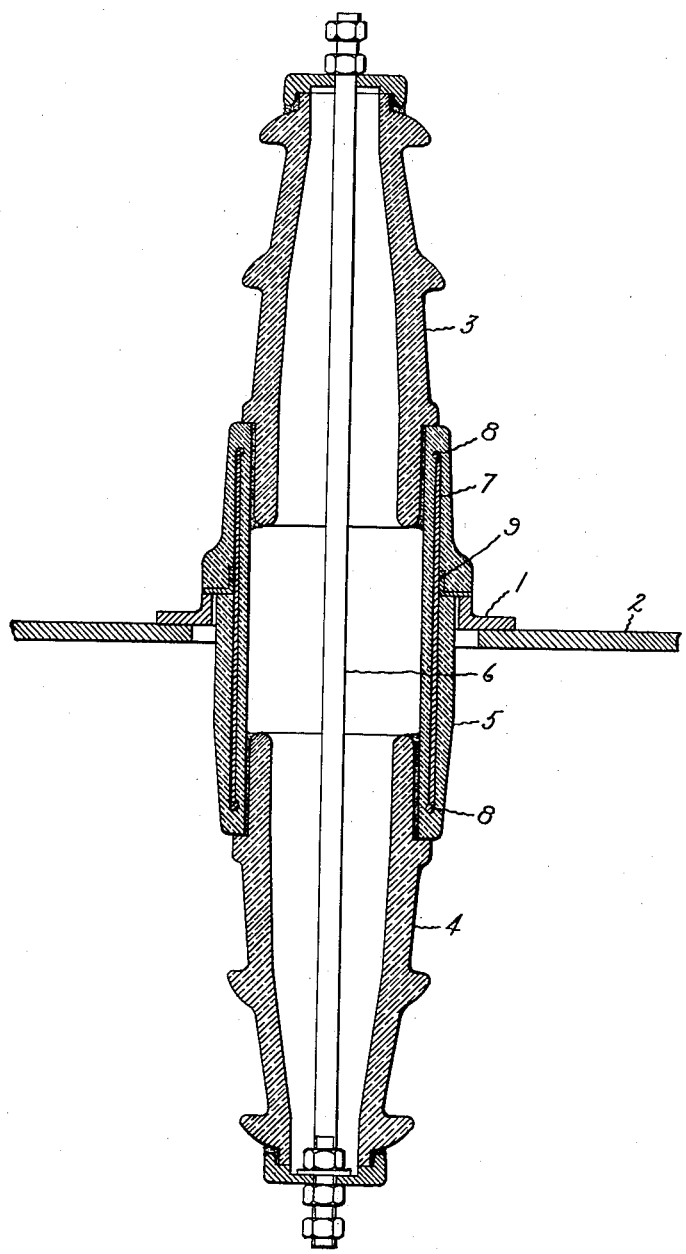
WITNESSES
INVENTOR
FERDINAND SIEBER
BY
HIS ATTORNEY

UNITED STATES PATENT OFFICE.

FERDINAND SIEBER, OF CHARLOTTENBURG, GERMANY, ASSIGNOR TO GENERAL ELECTRIC COMPANY, A CORPORATION OF NEW YORK.

INSULATOR.

1,253,736.   Specification of Letters Patent.   Patented Jan. 15, 1918.

Application filed July 15, 1914. Serial No. 851,193.

*To all whom it may concern:*

Be it known that I, FERDINAND SIEBER, a subject of the Emperor of Austria, residing at Charlottenburg, Germany, have invented certain new and useful Improvements in Insulators, of which the following is a specification.

My invention relates to insulators, and more particularly to the insulation of conductors where they pass through conductive parts or structures of electrical potentials different from their own. My invention is especially applicable to "sleeve" insulators for transformer leads carrying currents at very high voltages,—such as 100,000 to 150,000 volts, for example—and in explaining the invention hereinafter and describing the best embodiment at present known to me, I have therefore referred especially to this use of it. While, however, the invention extends to various specific features and details and combinations and arrangements of parts hereinafter illustrated and described, it is not confined thereto, but can be otherwise carried out and applied. Various advantages obtainable in connection with the invention will appear hereinafter and its scope will be indicated in my claims.

In the case of an insulator for the passage of a conductor through the wall structure of a transformer casing or the like, the greatest difference of potential occurs at the opposite sides of the casing wall, so that the danger of creepage or other trouble is greatest there. In accordance with my invention, I improve the electrical conditions by arranging between the casing (or other external metal layer) and the current carrying conductor a conductive protecting shield consisting of a layer of conducting material with insulating material pressed all about it or otherwise embedding it,—especially at the outer edges,—this shield being electrically connected with the transformer casing (or other external layer) and laterally extending the surface to which it is electrically connected beneath the surface of the insulating material. The distance from the protective shield to the exposed portion of the conductor beyond the insulating material is therefore less than the distance of the casing wall therefrom, and the difference of potential per unit length along the outside surface of the insulator adjacent the casing wall, and consequently the danger of creepage, is thereby considerably reduced. The shield means may consist of annular members embedded in a mass of insulation and conductively connected together, or may be made by embedding in a mass of insulation a sheet metal cylinder whose edges will preferably have been thickened to prevent excessive density of the electrostatic lines of force at these extremely dangerous places. It is advantageous to arrange the protective shield means in the walls of the insulator itself,—or, if the insulator is built up in a plurality of parts, in one of the insulating parts. In any case, the density of the electrostatic lines of force will be greatest at the opposite sides of the protective shield where the insulation is good.

The accompanying drawing shows a construction embodying the invention that is suitable for a high voltage transformer lead, most of the parts being in section. Here a sort of flanged collar or holder 1 for receiving the insulator is secured to the casing wall 2. The sleeve insulator proper is built up of three parts: the two end pieces 3, 4 and the middle piece 5 interposed between the collar 1 and the conductor or lead proper 6. In the middle part 5 is embedded a sheet metal cylinder 7 with its edges 8, 8 thickened and rounded, and this metal cylinder 7 is conductively connected to holder or collar 2 by means of a flanged collar-like metal piece 9 that rests on or is secured to it. Here the thickened edges 8, 8 are in effect the conductively connected annular members already mentioned. The interior of the whole insulator will preferably be filled with oil or other insulating fluid.

What I claim as new and desire to secure by Letters Patent of the United States, is:—

1. An insulator for the passage of a conductor through a conductive structure comprising a sleeve of insulating material and a conductive shield about the conductor where it passes through said structure completely embedded in the wall of said sleeve and electrically connected to said structure.

2. An insulator for the passage of a conductor through a conductive structure comprising a sleeve of insulating material and a conductive shield about the conductor where it passes through said structure comprising separated annular parts electrically connected together and to said structure and completely embedded in the wall of said sleeve.

3. An insulator for the passage of a conductor through a conductive structure comprising a sleeve of insulating material and a conductive shield about the conductor where it passes through said structure consisting of separated annular parts forming the thickened edges of a sheet metal cylinder interposed between said conductor and said structure, said shield being electrically connected to said structure and being completely embedded in the wall of said sleeve.

4. Means for suppressing brush discharge usual on the edges of metallic filling pieces and the like, comprising a layer of insulating material, a layer of conducting material disposed in said insulating material at a measured distance from the metal covered surface, said conducting layer having a larger lateral extension of surface than the external metal layer and being electrically connected with said external metal layer.

5. The combination with a conductor, a conducting member surrounding the same, and insulating material between said conductor and said member for insulating the same from each other, of means for suppressing brush discharge from said conducting member comprising a layer of conducting material surrounding said conductor, embedded in said insulating material, laterally extending the surface of said conducting member which is toward said conductor, and electrically connected to said conducting member.

6. The combination with a conductor, another conductor adjacent the first mentioned conductor, and insulating material between said conductors for insulating the same from each other, of means for suppressing brush discharge from one of said conductors adjacent the surface of said insulating material, said means comprising a layer of conducting material, embedded in said insulating material and electrically connected to said last mentioned conductor and enlarging the lateral extension of the surface of the same beneath the surface of the insulating material.

In witness whereof, I have hereunto set my hand this 17th day of June, 1914.

FERDINAND SIEBER.

Witnesses:
WOLDEMAR HAUPT,
HENRY HASPER.